US008006138B2

(12) United States Patent  
Nir-Buchbinder et al.

(10) Patent No.: US 8,006,138 B2  
(45) Date of Patent: Aug. 23, 2011

(54) SOFTWARE QUALITY ASSESSMENT BASED ON SEMANTIC SIMILARITIES

(75) Inventors: Yarden Nir-Buchbinder, Haifa (IL); Dan Pelleg, Haifa (IL); Orna Raz-Pelleg, Haifa (IL); Shmuel Ur, Shorashim (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/144,666

(22) Filed: Jun. 24, 2008

(65) Prior Publication Data

US 2009/0319833 A1    Dec. 24, 2009

(51) Int. Cl.  
*G06F 11/00* (2006.01)

(52) U.S. Cl. ........................ 714/38.1; 717/124

(58) Field of Classification Search .................... None  
See application file for complete search history.

(56) References Cited

U.S. PATENT DOCUMENTS

| 6,662,168 | B1 | 12/2003 | Wallach | |
|---|---|---|---|---|
| 6,862,698 | B1 * | 3/2005 | Shyu | 714/57 |
| 7,406,600 | B2 * | 7/2008 | Thomas et al. | 713/181 |
| 2005/0005194 | A1 * | 1/2005 | Scanlan et al. | 714/13 |

OTHER PUBLICATIONS

Microsoft Computer Dictionary, Microsoft Press, 1999, p. 214.*

* cited by examiner

*Primary Examiner* — Christopher S McCarthy

(57) ABSTRACT

A method for software processing includes accepting quality information, which includes names of elements of software code and respective quality indications regarding tested acceptability of the elements. The names are processed to extract a list of substrings that occur in the names. Respective metrics are assigned to the substrings responsively to the quality indications of the elements in whose names the substrings occur. At least some of the substrings are presented to a user in accordance with the assigned metrics.

19 Claims, 1 Drawing Sheet

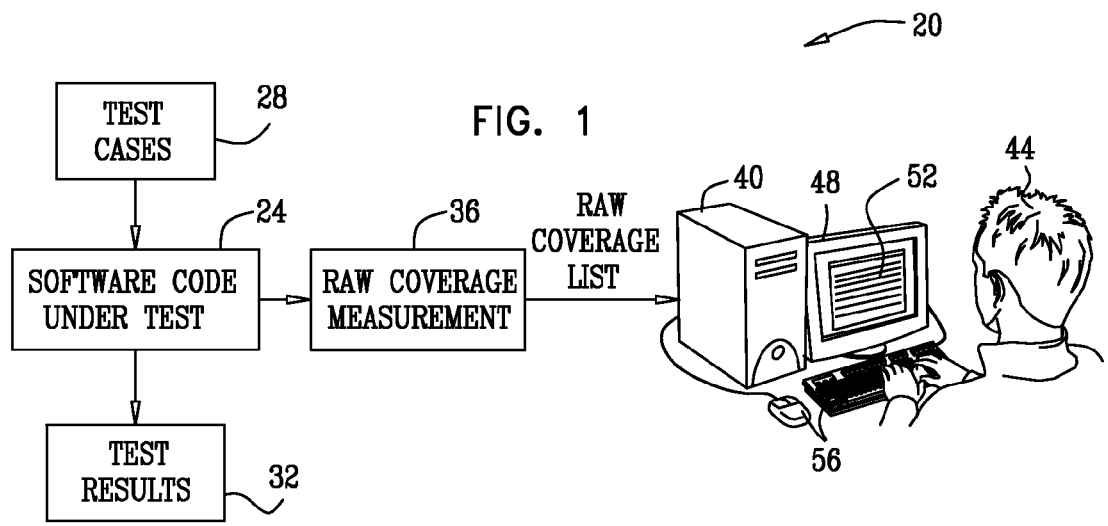
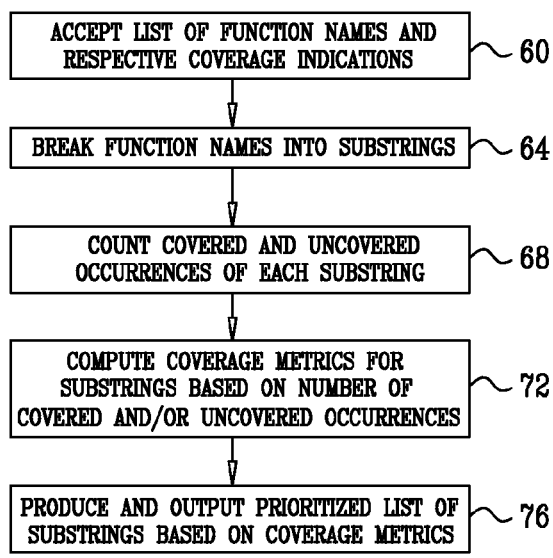

200; # SOFTWARE QUALITY ASSESSMENT BASED ON SEMANTIC SIMILARITIES

BACKGROUND

The present invention relates generally to computer software, and particularly to methods and systems for assessing the quality of software code.

Software code is commonly tested for faults ("bugs") by subjecting the code to a set of test cases, which is referred to as a test suite. It is often of interest to assess the quality of the software code, such as by assessing the coverage or other quality measure of the test suite, and/or by analyzing known faults in the code.

BRIEF SUMMARY

Embodiments of the present invention provide a method for software processing. The method includes accepting quality information, which includes names of elements of software code and respective quality indications regarding tested acceptability of the elements. The names are processed to extract a list of substrings that occur in the names. Respective metrics are assigned to the substrings responsively to the quality indications of the elements in whose names the substrings occur. At least some of the substrings are presented to a user in accordance with the assigned metrics. Other disclosed embodiments provide apparatus and computer software product for software processing.

The present invention will be more fully understood from the following detailed description of the embodiments thereof, taken together with the drawings in which:

BRIEF DESCRIPTION OF THE SEVERAL VIEWS OF THE DRAWINGS

FIG. 1 is a block diagram that schematically illustrates a system for software testing, in accordance with an embodiment of the present invention; and FIG. 2 is a flow chart that schematically illustrates a method for assessing software test coverage, in accordance with an embodiment of the present invention.

DETAILED DESCRIPTION

Overview

Known software quality assessment methods typically measure the quality of individual code elements such as files, classes, functions or basic blocks. For example, known coverage assessment methods typically measure and present test coverage of individual code elements. Such known methods usually organize and present the coverage information in accordance with the hierarchical structure of the code. In many cases, however, this type of information presentation does not provide correct focus on potential areas of concern and may miss important fault patterns. For example, some software faults are not related to specific code elements or to the hierarchical structure of the code, but rather to bug patterns or execution paths through the software that cut across multiple elements. Moreover, in complex software code, coverage information on individual code elements may well comprise millions of data records. Raw data of this magnitude is all but impossible for a human user, or even a group of users, to comprehend and analyze.

Embodiments of the present invention provide improved methods and systems for assessing the quality of software code, such as assessing test coverage. The methods and systems described herein aggregate and present quality information based on semantic similarities between code elements, rather than on the hierarchical structure of the code. Semantic similarities between code elements are determined by analyzing the names of the elements and identifying substrings that are common to multiple names. Quality information is aggregated and presented per substring rather than per code element.

Since the names given to software code elements are usually indicative of their semantic meaning, code elements having similar names are often associated with a common topic or context. As such, aggregating and presenting quality information per substring provides the user with insight as to aspects of the code that lack quality. Such an insight is not achievable by known software quality assessment methods.

In some embodiments that are described hereinbelow, a coverage processor accepts raw coverage information from a coverage measurement system. The raw coverage information typically comprises a list of names of code elements (e.g., functions or files) and corresponding coverage indications that indicate whether or not (and possibly the number of times) the elements are covered by a given test suite.

The coverage processor processes the element names and extracts a list of substrings that occur in the names. The processor then assigns respective metrics to the substrings. The metric of a given substring is computed based on the coverage indications of the code elements in whose names the substring occurs. For example, the metric of a given substring may be based on the number of times the substring occurs in names of code elements that are classified as "covered" in the raw coverage information.

The coverage processor presents a list of substrings to the user in accordance with the assigned metrics. Typically, poorly-covered substrings are presented first so as to draw attention to semantic contexts that lack coverage.

Since the methods and systems described herein aggregate and prioritize coverage information by semantic context rather than by code structure, they are able to determine poorly-covered areas of the code and reveal bug patterns that are undetectable by known methods. The methods and systems described herein automatically identify pervasive code coverage holes, which often cut across coverage data hierarchy. These methods and systems are thus highly effective for directing testing efforts to poorly-covered software paths and bug patterns.

The methods and systems described herein can be used to assess and present various aspects of software quality other than test coverage. For example, the number and/or types of known software faults can be assessed and associated with specific topics or contexts. Other quality measures, such as the effectiveness of a given testing phase in detecting faults, can also be assessed and aggregated per topic or context based on semantic similarities among code element names.

System Description

The description that follows refers mainly to test coverage assessment. This choice is made, however, purely for the sake of conceptual clarity. The methods and systems described herein can be adapted, mutatis mutandis, to assess other types of quality measures. Several such quality measures are described further below.

FIG. 1 is a block diagram that schematically illustrates a system 20 for software testing, in accordance with an embodiment of the present invention. System 20 tests software code 24 by subjecting the code to test cases 28. Code 24 may comprise source code, object code or any other suitable type of software code. The test procedure produces test results 32, which typically indicate identified faults and additional information for debugging purposes.

System 20 comprises a raw coverage measurement unit 36, which assesses the coverage achieved by test cases 28 and produces raw coverage information. The raw coverage information typically comprises a list of names of code elements, and respective coverage indications. The name of a given code element is typically provided as a textual string. The coverage indication of a given code element typically comprises a Boolean flag indicating whether or not the element was covered by test cases 28. In alternative embodiments, however, the coverage indications may provide quantitative measures of coverage or lack of coverage, and/or any other information that is indicative of coverage of the code element.

In the context of the present patent application and in the claims, the terms "code element" or "element of the code" refer to any desired partition of the software code having a name or title, such as, for example, files, functions, basic blocks, objects (e.g., classes in an object-oriented code) and/or variables. The partitioning of the software code into elements may thus have any desired granularity. As can be appreciated, the raw coverage information may well reach millions of element names.

The raw coverage information is provided to a coverage processor 40, which carries out the methods described herein. Processor 40 processes the element names provided in the raw coverage information, and determines a list of substrings that occur in the names. The processor then assigns respective metrics to the substrings. The metric of a given substring is computed based on the coverage indications of the code elements in whose names the substring occurs. The coverage processor presents a list 52 of substrings to a user 44 using an output device 48, such as a computer display. The user may scroll or otherwise manipulate the presented list using an input device 56, such as a mouse or keyboard.

In some embodiments, the functions of two or more components of system 20 may be carried out by a single processor. For example, the functions of processor 40 and unit 36 may be carried out by a single workstation, possibly together with a test generation unit that produces test cases 28. Unit 36 typically collects and stores the raw coverage information as part of the test procedure. Following the test procedure, the raw coverage information is retrieved and analyzed by processor 40, either on the same computer used for running the tests or on a different computer. Alternatively, any other suitable configuration or division of functions among different computers can be used.

Software Quality Assessment Using Substring Analysis

In many practical cases, some error events and bug patterns may not be identifiable at the level of individual code elements. For example, a particular user input may trigger an execution path that involves multiple code elements responsible for Input/Output (I/O) error handling. If, however, this particular user input is not applied by the test suite, the error handling execution path will not be taken, and the code elements participating in this path may not be covered. Such insight ("error handling execution paths are poorly-covered") will not be gained by examining the coverage of individual code elements, because it is based on the semantic similarity between the poorly-covered elements (which all have to do with I/O error handling) and not on the hierarchical structure of the code. The methods and systems described herein identify such semantic similarities by identifying similarities between names of code elements.

As noted above, coverage processor 40 generates a set of substrings that occur in the names of code elements provided in the raw coverage information. In some embodiments, the coverage processor generates all substrings that occur in the element names. Alternatively, processor 40 may generate only a partial set of substrings, such as only substrings that are longer than a certain threshold (e.g., substrings longer than four characters) and/or substrings that begin with a capital letter. Processor 40 may use any other suitable logic or criterion for cutting down the number of substrings in the set.

Processor 40 maintains one or more counters for each substring. The counters of a given substring accumulate coverage indications from the raw coverage information that are related to this substring. For example, processor 40 may count the number of code elements in which the substring occurs and which were classified as "covered" in the raw coverage information. Additionally or alternatively, processor 40 may count the number of code elements in which the substring occurs and which were classified as "uncovered."

Various criteria can be used for classifying code elements as "covered" or "uncovered." In some embodiments, code elements that were covered at least once by the test suite are classified as "covered," and code elements that were not covered at all are classified as "uncovered." In alternative embodiments, however, softer criteria can be used to determine whether code elements are adequately covered or not, and to classify them as "covered" or "uncovered" accordingly. For example, code elements that were covered less than a predefined number of times may be regarded as "uncovered." Further alternatively, any other suitable logic or criteria defined over the coverage indications can be used for classifying code elements as "covered" or "uncovered." In other words, code elements can be classified as "uncovered" if they are not sufficiently covered to meet a given criterion, and vice versa.

In some embodiments, some of the coverage indications comprise quality indications that indicate the presence of faults in the respective code elements. In these embodiments, a given code element can be classified as "uncovered" if it was covered but was found to contain a bug. Similarly, a code element can be classified as "covered" if it was covered by the test suite and found not to contain a bug. Additionally or alternatively, any other suitable criterion can be used for classifying code elements as "covered" or "uncovered" based on indications that specify the presence or absence of faults. (When generalizing the method to various other types of quality indications, the different code elements are classified as "acceptable" or "unacceptable".)

Typically, recurring substrings in the same element name are counted only once. (For example, if the element name is "aaaaaa", the substring "aaa" will be counted only once even though it has four occurrences in the element name.) Processor 40 typically maintains a data structure that stores the counters corresponding to the different substrings. This functionality may be carried out, for example, by a hash table.

Coverage processor 40 computes a coverage metric for each substring in the set based on the counter values of the substring. In some embodiments, the metric is defined so that high metric values indicate well-covered substrings, and vice versa. In alternative embodiments, however, an opposite convention can be used so that high metric values indicate poorly-covered substrings.

For example, the processor may compute the natural logarithm of the ratio between the number of "covered" occurrences and the number of "uncovered" occurrences of the substring. This sort of metric is referred to herein as a coverage quotient. In the present example, if no "covered" occurrences are found, the metric is set to −1000. If there are no "uncovered" occurrences, the metric is set to +1000.

As another example, the metric may comprise a ratio between the number of "covered" occurrences and the square root of the total number of occurrences. In alternative embodiments, processor 40 may compute any other suitable metric.

Processor 40 presents the list of substrings to user 44 using output device 48. The list is sorted and presented in accordance with the metric values of the substrings. The list is typically sorted so that poorly-covered substrings are presented first, thus drawing attention to poorly-covered substrings. When two or more substrings have the same metric value, the processor may present longer substrings (or alternatively strings having a higher number of occurrences) first. In alternative embodiments, the processor may sort the substrings by the total number of occurrences. When two or more substrings have the same number of occurrences, longer substrings may be presented first.

In some embodiments, processor 40 filters the set of substrings and presents only a subset of the substrings to the user. For example, the processor may filter out substrings whose number of occurrences is smaller than a predefined threshold (e.g., substrings having fewer than ten occurrences). Additionally or alternatively, the processor may filter out substrings whose coverage quotient is smaller than a given threshold, e.g., smaller than log(1/20). Further additionally or alternatively, the processor may use any other suitable criterion for filtering the substrings based on their metric values.

The following table gives an example of a sorted list of substrings that may be produced by processor 40:

| Substring | Metric |
| --- | --- |
| .IoError | 1000 |
| com.ws.sib.wsn.www.types.wsrf.properties. | 983 |
| StatelessDummy | 701 |
| ConnectorFactory$1 | 689 |
| TablePropert | 675 |
| .util.Sibws | 667 |
| ImplFactory | 667 |
| Array$SubArray | 634 |
| ... | ... |

The substrings in the list above are sorted in descending order of the metric value. The substring ".IoError" is the least-covered substring in the set and is therefore presented first. Code elements in which this substring occurs (such as "GUI.Handler.IoError," "DBConnector.IoError" and "Logic.IoError.Math") are considered to have poor coverage and are therefore likely candidates for subsequent coverage enhancement. The other strings are listed in decreasing order of non-coverage severity.

User 44 may perform various actions with respect to the software code based on the presented list of substrings. For example, the user may modify test cases 28 (e.g., add, delete or modify test cases) and re-test the code using the modified test cases, in order to improve the coverage of code elements associated with the poorly-covered substrings.

In some embodiments, processor 40 extracts and considers only substrings that are selected from a predefined collection of allowed substrings, such as a dictionary. This technique enables the user to concentrate on specific aspects of the software code, and to direct the coverage assessment process accordingly. Additionally or alternatively to using a dictionary, the user may provide a regular expression that defines a template of the allowed substrings. Further additionally or alternatively, the user may select one of several coding styles (e.g., GNU, K&R or Java) to determine which substrings should be considered.

In some embodiments, the processor transforms the generated substrings into a common, canonical form before counting their occurrences. For example, the processor may remove vowels from the substrings (possibly from all but the first position in the substring) and/or reduce double letters to single letters. Techniques of this sort are described, for example, in U.S. Pat. No. 6,662,168.

Coverage Assessment Method Description

FIG. 2 is a flow chart that schematically illustrates a method for assessing software test coverage, in accordance with an embodiment of the present invention. In the present example, the code elements comprise functions. The method begins with processor 40 accepting raw coverage information detailing the coverage of the different software functions by a given test suite, at an input step 60. The raw coverage information comprises a list of function names (strings) and corresponding coverage indications (Boolean "covered"/"uncovered" flags).

Processor 40 generates a set of substrings that occur in the function names, at a substring generation step 64. The coverage processor counts "covered" and "uncovered" occurrences of the different substrings in the function names, at a counting step 68. For each substring, the processor counts the number of function names in which the substring occurs and which were covered by the test suite in question. The processor also counts the number of function names in which the substring occurs and which were not covered by the test suite in question. The processor stores the counter values, e.g., in a hash table.

Processor 40 computes a coverage metric for each substring based on the counter values of the substring, at a metric computation step 72. The coverage processor produces and outputs a list of substrings, which is sorted in accordance with the metric values of the different substrings, at an output step 76. The processor displays the list to user 44 using output device 48.

The methods described herein can be applied in a recursive manner, so as to refine the results and further identify semantic connections between code elements. In a typical recursive flow, when processor 40 produces and presents a sorted list of substrings, the user selects a given poorly-covered substring from the list. The coverage processor re-applies the coverage assessment methods described herein to the code elements in which the selected string occurs. In other words, processor 40 repeats the process of generating substrings, computing metrics and producing a sorted substring list. In this iteration, however, the processor considers only the code elements in which the substring selected by the user occurred.

In the example given above, the user is presented with the insight that code elements related to I/O error handling lack sufficient coverage. In a large and complex system, however, it may be difficult for the user to translate this insight to additional test cases. Therefore, the user may wish to refine the analysis of code elements that are related to I/O error handling. In order to do so, the user selects the first substring in the sorted list (".IoError"). Processor 40 then repeats the process, while considering only the code elements in which the substring (".IoError") occurred. Various conditions and criteria (e.g., substring filtering or sorting criteria) may change from one iteration to another.

Additional Applications and Quality Measures

As noted above, the methods and systems described herein can be used to assess other quality indications of given software code, and aggregate such indications based on semantic similarities between names of code elements. In general, a processor may accept quality information, which comprises names of elements (e.g., files or functions) of the software code and respective quality indications related to these code elements. The quality indication of a given code element is indicative of the acceptability of the element, as tested by a given test suite.

The processor extracts a list of substrings that occur in the elements names, and assigns respective metrics to the substrings based on the quality indications of the elements in whose names the substrings occur. The processor then presents at least some of the substrings to a user, using an appropriate output device, in accordance with the assigned metrics.

In some embodiments, the methods and systems described herein are used to identify whether or not a set of known software faults is concentrated in a given functional domain (e.g., topic or context, as represented by a substring). Various actions can be taken if a certain functional domain is found to contain an exceptionally high concentration of faults. For example, debugging resources can be dedicated to that domain. As another example, shipping of this domain to a customer can be delayed.

Consider, for example, a scenario in which 90% of the known faults in a certain word processing product are found to be related to a software feature that exports a document to a different format. In such a case, it may be decided that this export feature will be deferred to a later release.

In such applications, the quality indication of a given code element is indicative of the presence or absence (and possibly the number or severity) of known faults in the code element. Such information can be obtained, for example, from a Version Control System (VCS) or from any other suitable source.

Another possible application of the methods and systems described herein is in assessing software quality based on the testing phase in which certain faults were detected.

In a typical software testing methodology, the code (or parts thereof) is subjected to several subsequent testing phases. A common methodology is to initially perform unit tests on specific software units, then perform functional verification, and finally perform system tests. In some Quality Assurance (QA) methodologies, when a fault is discovered, a determination is made as to which testing phase should have detected this fault first.

The target of such methodologies is typically to ensure that faults are detected as early as possible in the testing sequence. For example, if many of the faults detected by system tests are simple enough to have been discovered by an earlier testing phase (e.g., during functional verification or even unit tests), then the tested software may be regarded as not sufficiently tested.

In some embodiments, the methods and systems described herein can be used to determine whether a certain functional domain (context or topic, as represented by a substring) is sufficiently tested, by aggregating the faults in the code elements associated with this domain that could have been initially detected by an earlier testing phase. For example, the quality indication of a given code element may be set to "0" if some or all of the faults found in the code element were expected to be initially discovered by an earlier testing phase than the phase in which they were actually discovered. Code elements in which all known faults were initially discovered in the same testing phase in which they were supposed to be found are assigned a quality indication of "1". If a certain functional domain is found to contain a high concentration of "0" quality indications, then this domain may be regarded as unfit for the next product phase (e.g., unfit for the next testing phase or for shipping). Such a domain may be subjected to additional testing.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

Although the embodiments described above mainly address assessing test coverage of software code that subsequently executes on a suitable processor, the methods and systems described herein can also be used for assessing test coverage of firmware code. The firmware code may be written in any suitable language, such as in C. In the context of the present patent application and in the claims, such code is also regarded as a sort of software code.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for software processing, comprising:
   accepting quality information comprising names of elements of software code and respective quality indications regarding tested acceptability of the elements;
   processing the names to extract a list of substrings that occur in the names;
   assigning respective metrics to the substrings responsively to the quality indications of the elements in whose names the substrings occur; and
   presenting at least some of the substrings to a user in accordance with the assigned metrics,
   wherein the quality indications are indicative of known faults in the respective elements,
   and wherein the quality indications are indicative of the known faults in the respective elements that were expected to be initially found by a first testing phase but were initially found by a second testing phase subsequent to the first testing phase.

2. The method according to claim 1, wherein the quality indications are indicative of the acceptability of the elements in response to subjecting the code to a set of test cases, and comprising modifying the set of test cases responsively to the presented at least some of the substrings and applying the modified set of test cases to the software code.

3. The method according to claim 1, wherein the quality information comprises coverage information, and wherein the quality indications are indicative of test coverage of the respective elements by a set of test cases.

4. The method according to claim 1, wherein processing the names comprises extracting only a subset of the substrings that occur in the names in accordance with a predefined criterion.

5. The method according to claim 1, wherein presenting the at least some of the substrings comprises filtering the extracted list of the substrings responsively to the respective metrics, to produce the at least some of the substrings.

6. The method according to claim 1, and comprising:
   selecting one of the presented substrings;
   re-extracting the substrings from only the elements in whose names the selected substring occurs;
   re-assigning the metrics to the re-extracted substrings; and
   presenting at least some of the re-extracted substrings to the user in accordance with the re-assigned metrics.

7. The method according to claim 1, wherein processing the names comprises extracting only the substrings that appear in a predefined collection of allowed substrings.

8. The method according to claim 1, wherein processing the names comprises transforming the extracted substrings to a canonical form.

9. A method for software processing, comprising:
   accepting quality information comprising names of elements of software code and respective quality indications regarding tested acceptability of the elements;
   processing the names to extract a list of substrings that occur in the names;
   assigning respective metrics to the substrings responsively to the quality indications of the elements in whose names the substrings occur; and
   presenting at least some of the substrings to a user in accordance with the assigned metrics,
   wherein assigning the metrics comprises determining a number of the elements in whose names a given substring occurs and which are indicated by the quality indications as being acceptable, and computing a metric of the given substring based on the number, and wherein computing the metric comprises computing a ratio between the number and a square root of a total number of the elements in whose names the given substring occurs.

10. The method according to claim 9, wherein determining the number comprises accumulating occurrences of the given substring in the elements in a hash table.

11. The method according to claim 9, wherein assigning the metrics further comprises determining another number of the elements in whose names the given substring occurs and which are indicated by the quality indications as unacceptable, and computing the metric of the given substring based on the number and on the other number.

12. The method according to claim 11, wherein computing the metric comprises computing a ratio between the number and the other number.

13. Apparatus for software processing, comprising:
a processor, which is configured to accept quality information comprising names of elements of software code and respective quality indications regarding tested acceptability of the elements, to process the names so as to extract a list of substrings that occur in the names, and to assign respective metrics to the substrings responsively to the quality indications of the elements in whose names the substrings occur; and
an output device, which is coupled to present at least some of the substrings to a user in accordance with the assigned metrics,
wherein the processor is configured to determine a number of the elements in whose names a given substring occurs and which are indicated by the quality indications as being acceptable, and to compute a metric of the given substring based on the number,
and wherein the processor is further configured to determine another number of the elements in whose names the given substring occurs and which are indicated by the quality indications as unacceptable, and to compute the metric of the given substring based on the number and on the other number.

14. The apparatus according to claim 13, wherein the quality information comprises coverage information, and wherein the quality indications are indicative of test coverage of the respective elements by a set of test cases.

15. The apparatus according to claim 13, wherein the quality indications are indicative of known faults in the respective elements.

16. The apparatus according to claim 15, wherein the quality indications are indicative of the known faults in the respective elements that were expected to be initially found by a first testing phase but were initially found by a second testing phase subsequent to the first testing phase.

17. The apparatus according to claim 13, wherein the processor is configured to determine the number by accumulating occurrences of the given substring in the elements in a hash table.

18. The apparatus according to claim 13, wherein the processor is configured to extract only a subset of the substrings that occur in the names in accordance with a predefined criterion.

19. The apparatus according to claim 13, wherein the processor is configured to filter the extracted list of the substrings responsively to the respective metrics, so as to produce the at least some of the substrings.

* * * * *